US012623798B2

(12) United States Patent
Klusak et al.

(10) Patent No.: US 12,623,798 B2
(45) Date of Patent: May 12, 2026

(54) AIRCRAFT

(71) Applicant: ORTHODRONE GMBH, Kiel (DE)

(72) Inventors: Juri Niklas Klusak, Kiel (DE); Nils Lieckfeldt, Melsdorf (DE); Mirko Jesper Denecke, Bremerhaven (DE); Max-Christoph Gurgel, Kiel (DE); Sebastian Schock, Bendfeld (DE); Christine Elizabeth Avery, Kiel (DE); Julian Teege, Flensburg (DE); Clara Andrea Drummer, Kiel (DE)

(73) Assignee: ORTHODRONE GmbH, Kiel (DE)

( * ) Notice: Subject to any disclaimer, the term of this patent is extended or adjusted under 35 U.S.C. 154(b) by 0 days.

(21) Appl. No.: 18/691,352

(22) PCT Filed: Sep. 13, 2022

(86) PCT No.: PCT/EP2022/075454
§ 371 (c)(1),
(2) Date: Mar. 12, 2024

(87) PCT Pub. No.: WO2023/037014
PCT Pub. Date: Mar. 16, 2023

(65) Prior Publication Data
US 2024/0417114 A1 Dec. 19, 2024

(30) Foreign Application Priority Data
Sep. 13, 2021 (DE) .......................... 202021104932.4

(51) Int. Cl.
*B64U 30/296* (2023.01)
*B64U 10/14* (2023.01)
*B64U 30/24* (2023.01)

(52) U.S. Cl.
CPC ........... *B64U 30/296* (2023.01); *B64U 10/14* (2023.01); *B64U 30/24* (2023.01)

(58) Field of Classification Search
CPC ........................... B64U 30/296; B64U 30/297
See application file for complete search history.

(56) References Cited

U.S. PATENT DOCUMENTS

| | | | | |
|---|---|---|---|---|
| 10,065,726 B1 * | 9/2018 | Phan | ...................... | B64D 17/80 |
| 10,577,125 B1 | 3/2020 | Burtt et al. | | |

(Continued)

FOREIGN PATENT DOCUMENTS

| | | | | |
|---|---|---|---|---|
| DE | 102013021884 A1 * | 3/2015 | ........... | B64C 39/024 |
| GB | 2469431 B * | 7/2012 | ......... | B64C 29/0033 |
| JP | 2020026270 A | 2/2020 | | |

OTHER PUBLICATIONS

International Search Report and Written Opinion for PCT/EP2022/075454 issued by the European Patent Office, 16 pgs. including English translation.

*Primary Examiner* — Christopher P Ellis
(74) *Attorney, Agent, or Firm* — Mueting Raasch Group

(57) ABSTRACT

Described is an aircraft, in particular a drone, with a supporting body (2) and at least two propulsion arrangements (4, 8) arranged at a distance from one another on the supporting body (2), which are designed to generate a propulsive thrust in a direction of propulsion (8b). According to a first aspect of the invention, the propulsion arrangements (4, 8) on the supporting body (2) are each mounted so as to be pivotable independently of one another about a first axis of pivoting (6) extending at an angle to the direction of propulsion (8b) and a first actuating drive (10) is provided and designed to pivot the propulsion arrangements (4, 8) independently of one another about the first axis of pivoting (6). According to a second aspect of the invention, in which a trunk body (20) is provided, this trunk body (20) is mounted on the supporting body (2) so as to be pivotable about a second axis of pivoting (22) and a second actuating (Continued)

Figure 1:
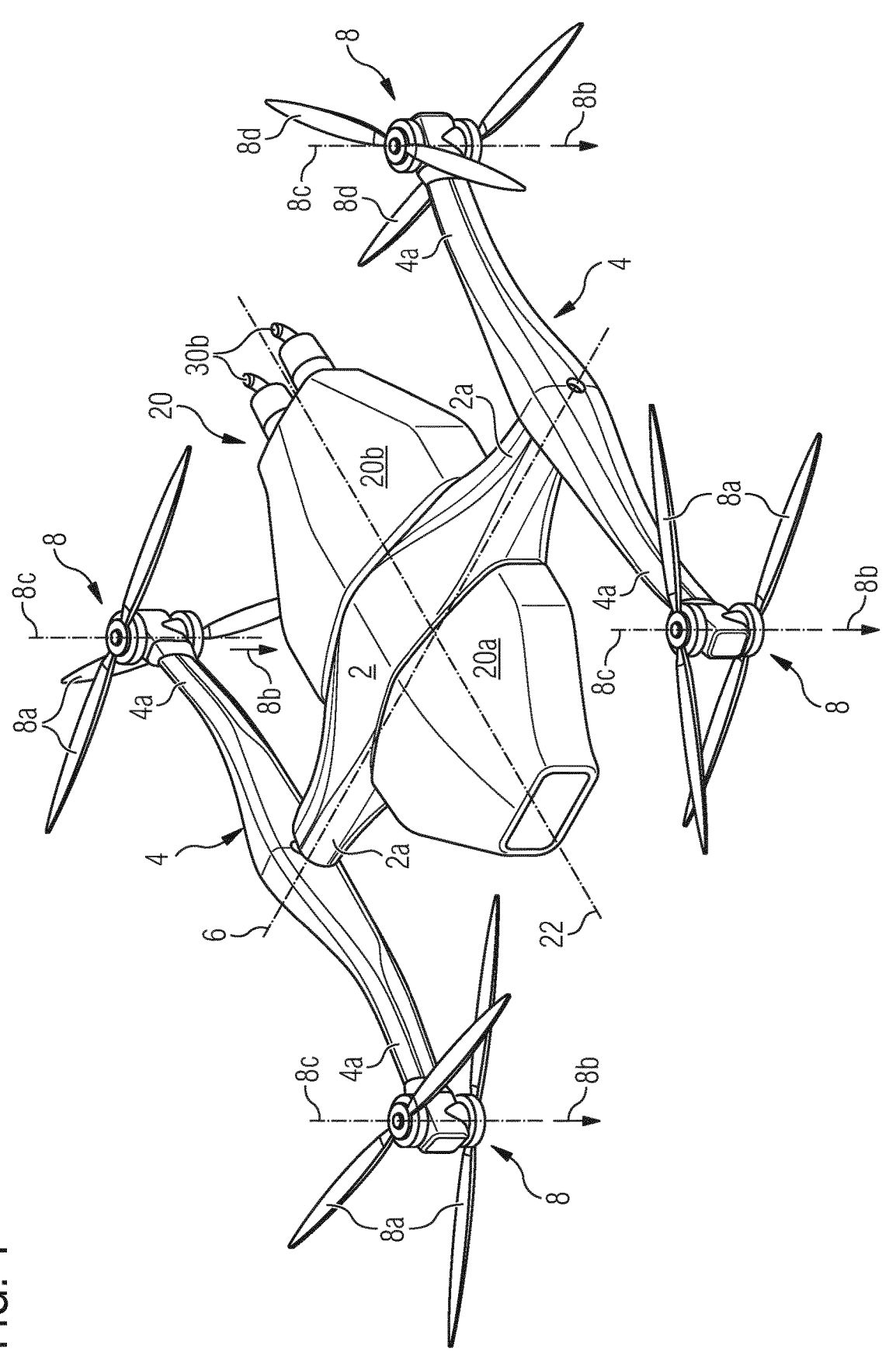

drive (24) is provided and designed to pivot the supporting body (2) relative to the trunk body (20).

26 Claims, 7 Drawing Sheets

(56)                    References Cited

U.S. PATENT DOCUMENTS

| 2016/0137298 | A1* | 5/2016 | Youngblood .......... A63H 27/12 |
| | | | 244/17.23 |
| 2018/0281941 | A1 | 10/2018 | Hutson |
| 2020/0023964 | A1 | 1/2020 | Valente et al. |
| 2020/0140080 | A1 | 5/2020 | Regev |
| 2020/0278699 | A1* | 9/2020 | Shimizu .................. B64C 27/32 |
| 2020/0324885 | A1* | 10/2020 | Bernard ................. B64U 10/20 |
| 2021/0261252 | A1* | 8/2021 | Dayan ...................... B64D 1/02 |
| 2022/0126995 | A1* | 4/2022 | Wu ...................... G05D 1/0858 |
| 2022/0219830 | A1* | 7/2022 | Zhang ................... B64U 10/14 |
| 2022/0324567 | A1* | 10/2022 | Worrall ................. B64U 20/87 |
| 2022/0411052 | A1* | 12/2022 | Angelucci ............. B64U 20/87 |

* cited by examiner

FIG. 2

AIRCRAFT

This application is the § 371 U.S. National Stage of International Application No. PCT/EP2022/075454, filed 13 Sep. 2022, which claims the priority to German No. 20 2021 104 932.4, filed 13 Sep. 2021, the disclosures of which are incorporated by reference herein in their entireties.

The invention relates to an aircraft, in particular a drone, with a supporting body and at least two propulsion arrangements arranged at a distance from one another on the supporting body, which are designed to generate a propulsive thrust in a direction of propulsion.

Such an aircraft is known from the state of the art. For example, there are embodiments in which the supporting body forms the trunk body or at least part of the trunk body and thus receives a payload such as a camera and/or measuring sensors. On the other hand, there are also embodiments in which a separate trunk body is provided, which is arranged on the supporting body.

It is a task of the present invention to improve the aircraft with regard to its flight stabilization.

This task is solved according to a first aspect of the present invention with an aircraft, in particular a drone, having a supporting body, at least two propulsion arrangements which are arranged at a distance from one another on the supporting body and are designed to generate a propulsive thrust in a direction of propulsion, the propulsion arrangements being mounted on the supporting body so as to be pivotable independently of one another in each case about a first axis of pivoting running at an angle to the direction of propulsion, and a first actuating drive which is designed to pivot the propulsion arrangements independently of one another about the first axis of pivoting.

The fact that, according to the invention, the propulsion arrangements on the supporting body are each mounted so as to be pivotable independently of one another about a first axis of pivoting extending at an angle to the direction of propulsion and can be pivoted independently of one another about the first axis of pivoting with the aid of the first actuating drive means that optimum balancing and thus safe flight stabilization can be achieved in a particularly advantageous manner. In particular, the first axis of pivoting assumes the function of a pitch axis. Even if we are only talking about a first actuating drive, the first actuating drive is designed in such a way that it applies a pivoting movement to the propulsion arrangements independently of each other. Preferably, a separate drive forming a component of the first actuating drive is provided for at least one of the at least two propulsion arrangements arranged at a distance on the supporting body, which drive has at least two motors with gearboxes to achieve redundancy and eliminate gear backlash as well as a brake that blocks the gearbox and is switched on in particular with electromagnets; however, other drive solutions for the propulsion arrangements are of course also conceivable.

Preferred exemplary embodiments and further embodiments of the first aspect according to the invention are given in the dependent claims 2 through 12.

Preferably, the relative orientation of the direction of propulsion of the propulsion arrangements in relation to a virtual plane of pivoting at right angles to the first axis of pivoting remains constant in every stage of pivoting of the propulsion arrangements. This means that additional pivoting of the propulsion arrangements about a further axis of pivoting running at an angle to the first axis of pivoting is excluded, so that the propulsion arrangements can only be pivoted about the first axis of pivoting and therefore in this case this pivoting movement forms the only pivoting movement of the propulsion arrangement.

Preferably, the propulsion arrangements are mounted on the supporting body so as to be pivotable about a first axis of pivoting that runs essentially at right angles to the direction of propulsion.

If the two preferred embodiments mentioned above are combined with each other, this results in the direction of propulsion of the propulsion arrangements lying in the virtual plane of pivoting at right angles to the first axis of pivoting or being oriented parallel to this virtual plane of pivoting in every pivoting position of the propulsion arrangements.

Conveniently, the propulsion arrangements are mounted so as to be pivotable about a common first axis of pivoting. Accordingly, the first axis of pivoting of one propulsion arrangement coincides with the first axis of pivoting of the other propulsion arrangement, although the propulsion arrangements remain mounted independently of one another so as to be pivotable about the common first axis of pivoting.

Preferably, at least one propulsion arrangement has at least one propulsion drive which is designed to generate the propulsive thrust in the direction of propulsion.

In a further preferred exemplary embodiment, at least one propulsion arrangement has a support element and two propulsion drives arranged at a distance from one another on the support element, the support element being mounted so as to be pivotable about the first axis of pivoting at a point between the two propulsion drives. This support element is preferably designed as an arm. In a further development of this exemplary embodiment, the support element is mounted about the first axis of pivoting at a point that is essentially the same distance from the two propulsion drives, resulting in an essentially central mounting of the support element on the supporting body in relation to the propulsion drives.

In a further development of the aforementioned exemplary embodiment, the relative orientation of the direction of propulsion of the propulsion drives in relation to the support element remains constant in every stage of pivoting of the propulsion arrangements. This means that additional individual pivoting of the propulsion drives relative to the support element is excluded, so that the propulsion drives of a propulsion arrangement can only be pivoted about the first axis of pivoting and thus in this case this pivoting movement forms the only pivoting movement of the propulsion arrangement and its propulsion drives.

Conveniently, at least one propulsion arrangement can have at least two propulsion drives whose directions of propulsion are oriented parallel to each other.

Furthermore, at least one propulsion drive can be a rotor driven about an axis of rotation, with the axis of rotation defining the direction of propulsion. Alternatively or additionally, at least one propulsion drive can be a turbine. Other propulsion drive designs are also conceivable in principle.

If a rotor that can rotate about an axis of rotation is used as a propulsion drive, the axis of rotation can preferably be taken as the reference point, in that the support element is mounted so as to be pivotable about the first axis of pivoting at a point that is essentially at the same distance from the axes of rotation of the rotors.

Preferably, a first sensor device is provided and designed to detect the pivoting position of the propulsion arrangements in space and/or relative to the supporting body, and a control device is provided and designed to use the signals from the first sensor device to control the first actuating drive so that the propulsion arrangements assume a specific pivoting position in space and/or relative to the supporting body.

The aforementioned task is further solved according to a second aspect of the invention with an aircraft having a supporting body, at least two propulsion arrangements which are arranged at a distance from one another on the supporting body and are designed to generate a propulsive thrust in a direction of propulsion, a trunk body which is mounted on the supporting body so as to be pivotable about a second axis of pivoting, and a second actuating drive which is designed to pivot the supporting body relative to the trunk body.

According to this, the aircraft not only has the already mentioned supporting body, but is also provided with a separate trunk body, which is mounted on the supporting body so as to be pivotable about a second axis of pivoting. With this measure according to the invention, an optimal balancing of the trunk body can be achieved, which also contributes to the desired safe flight stabilization. In particular, the second axis of pivoting assumes the function of a rolling axis.

Preferred exemplary embodiments and further embodiments of the second aspect according to the invention are given in the dependent claims 16 through 26.

Of course, the two aspects according to the invention can be combined with each other, with the second axis of pivoting being oriented at an angle, preferably at right angles, to the first axis of pivoting.

Preferably, the trunk body is mounted so as to be pivotable, at a point on the supporting body which is essentially at the same distance from the two propulsion arrangements. According to this, the second axis of pivoting runs essentially in the middle between the two propulsion arrangements and the trunk body is therefore mounted essentially in the middle of the supporting body and thus essentially in the middle between the two propulsion arrangements, which are arranged at a distance.

Preferably, the second axis of pivoting is oriented at an angle, preferably essentially at right angles, to the direction of propulsion of the propulsion arrangements.

In a further preferred exemplary embodiment, a second sensor device is provided and designed to detect the pivoting position of the supporting body in space and/or relative to the trunk body, and a control device is provided and designed to use the signals from the second sensor device to control the second actuating drive so that the supporting body assumes a specific pivoting position in space and/or relative to the trunk body.

In a further development of this exemplary embodiment, the control device is designed to control the second actuating drive in such a way that the trunk body remains essentially in a predetermined fixed orientation; this further development is particularly advantageous if a sensor system is provided in the trunk body, which produces particularly precise measurement results in the event that the trunk body remains in a predetermined fixed orientation.

In a combination of the two aspects according to the invention, a common control device can preferably be provided, which is designed to control the first and second actuating drives in such a way that the trunk body remains essentially in a predetermined fixed orientation.

The trunk body is designed for receiving a payload. In a further development of this exemplary embodiment, the trunk body can preferably have a first section which extends from the first axis of pivoting in a first direction and is intended for receiving payload and is designed in particular as a nacelle, and a second section which extends from the first axis of pivoting in a second direction oriented at an angle to the first direction, in particular in the opposite direction, and contains the actuating drive at least partially an energy supply device for the actuating drives. According to this, the first section can optionally be located in front of the first axis of pivoting and the second section behind the first axis of pivoting or, conversely, the first section behind the first axis of pivoting and the second section in front of the first axis of pivoting.

Furthermore, the trunk body can be aerodynamically shaped in such a way that it generates lift during flight.

Finally, both according to the first aspect of the invention or the second aspect of the invention as well as in a combination of the two aspects, the supporting body can be aerodynamically shaped in such a way that it generates lift during flight, and for this purpose can in particular have the shape of a wing.

Figure 3:
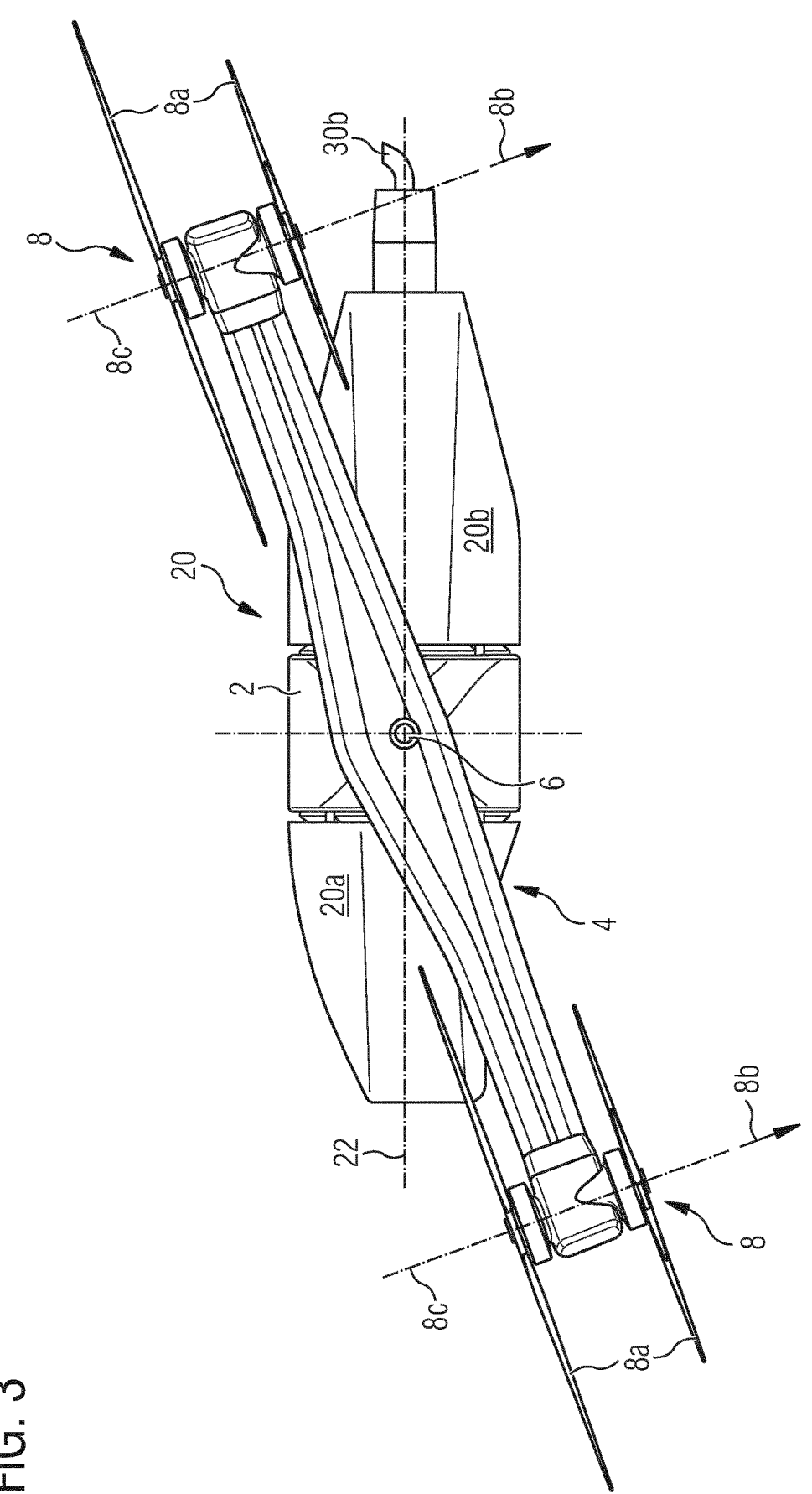
Figure 4:
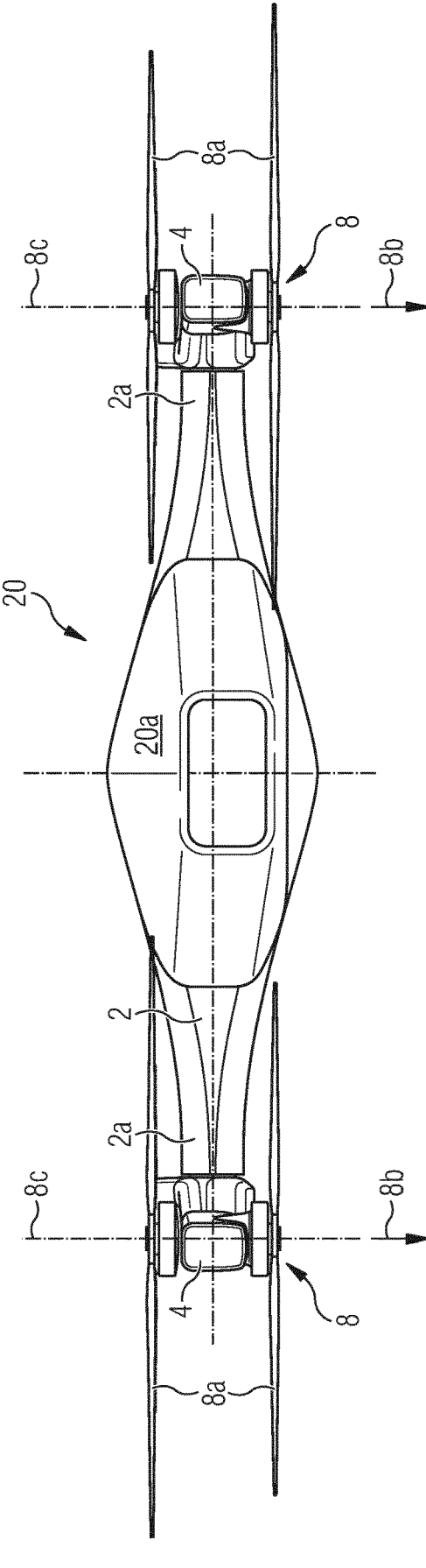
Figure 5:
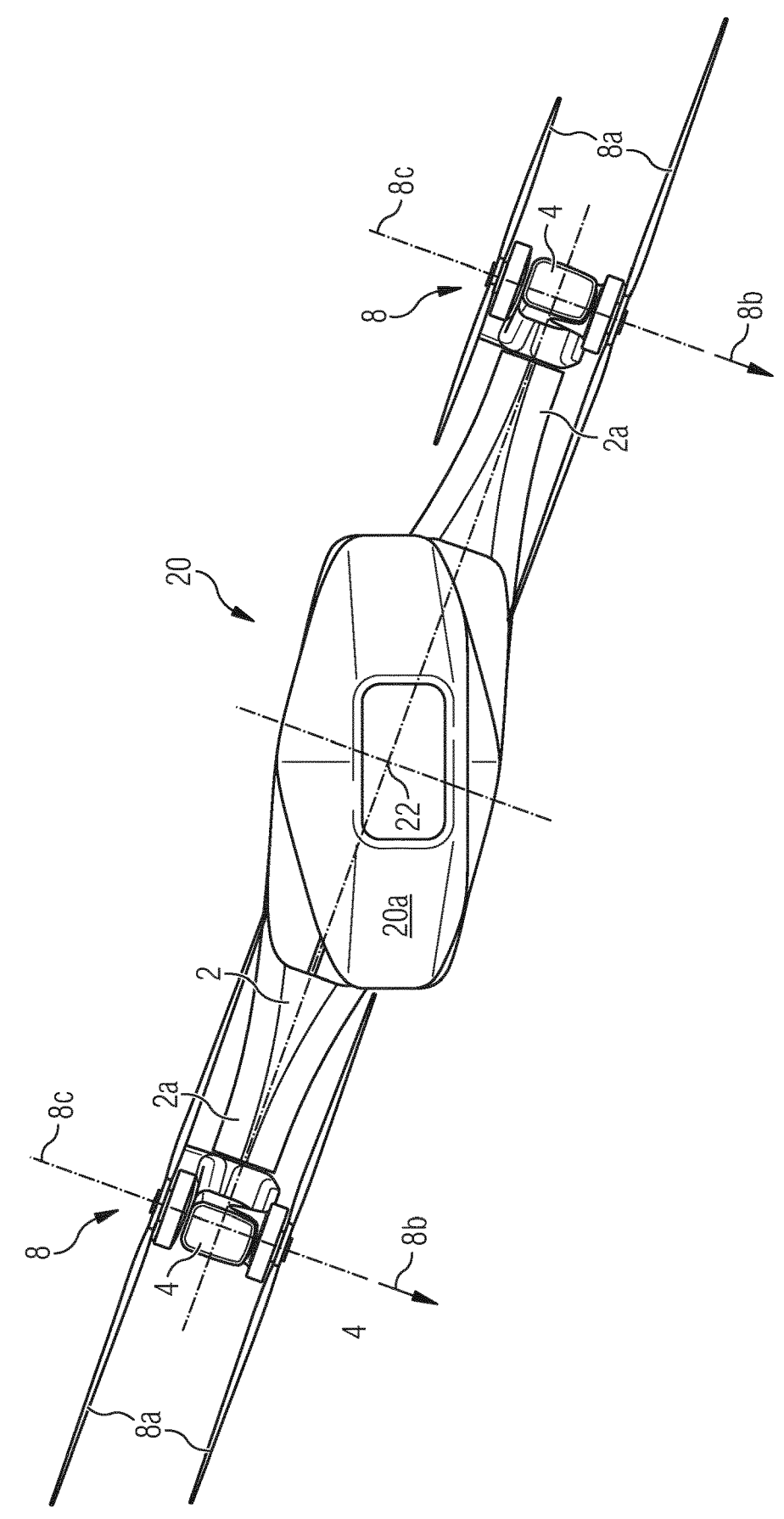
Figure 6A:
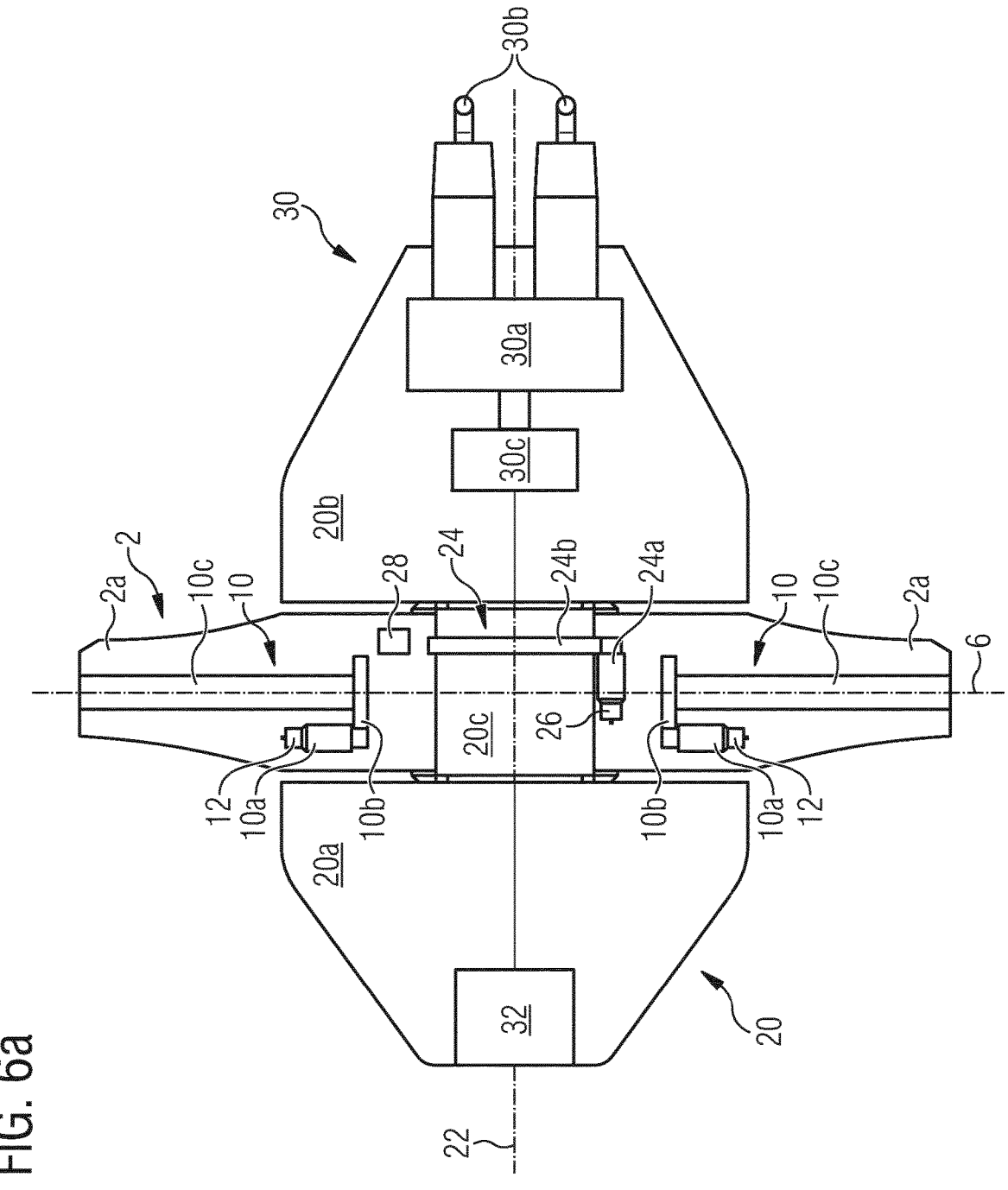
Figure 6B:
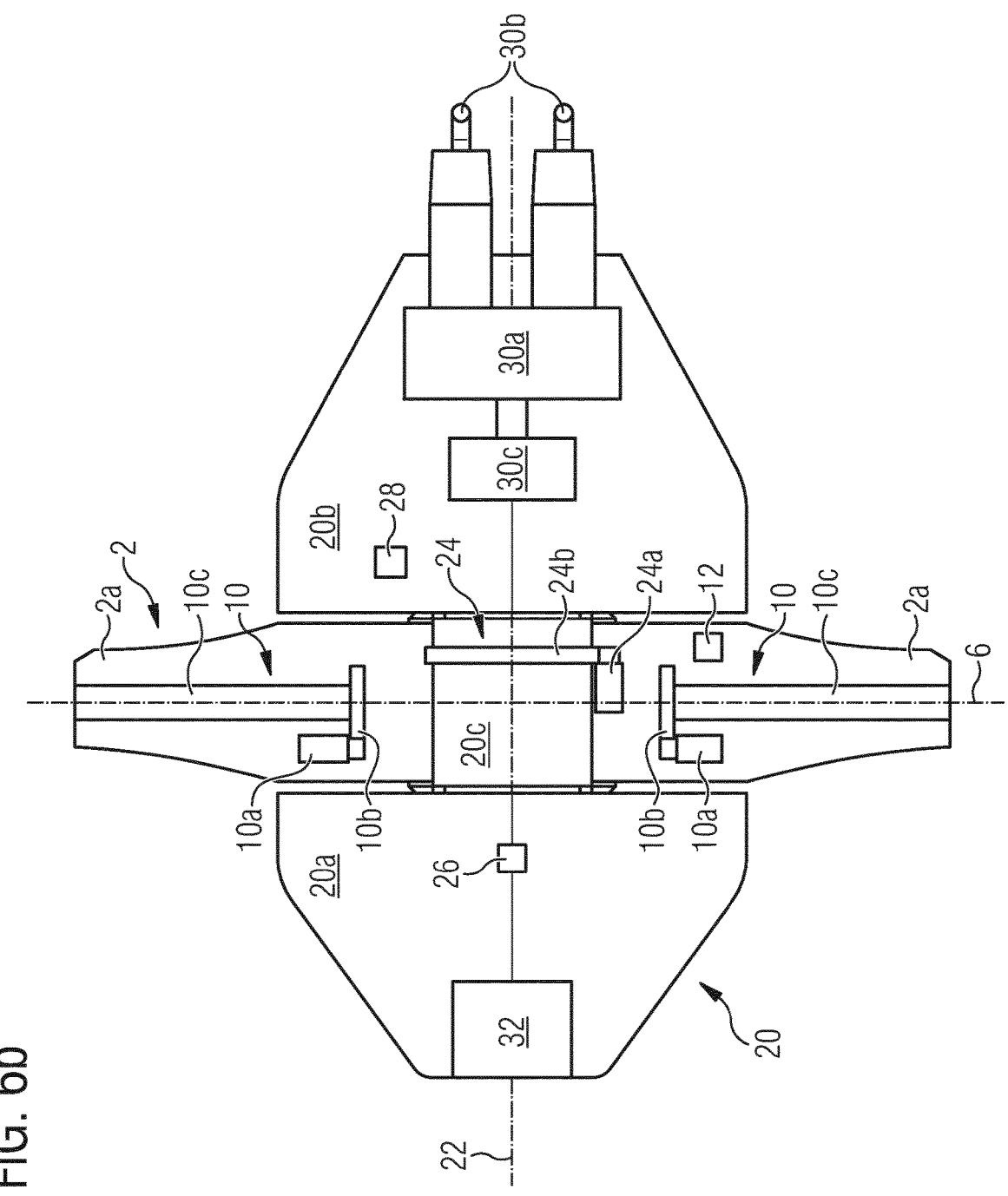

In the following, a preferred exemplary embodiment of the invention is explained in more detail with reference to the accompanying drawings. The figures show the following:

FIG. 1 a perspective top view of an aircraft according to a preferred exemplary embodiment with the rotor arms and the nacelle each in a neutral position relative to the yoke;

Figure 2:
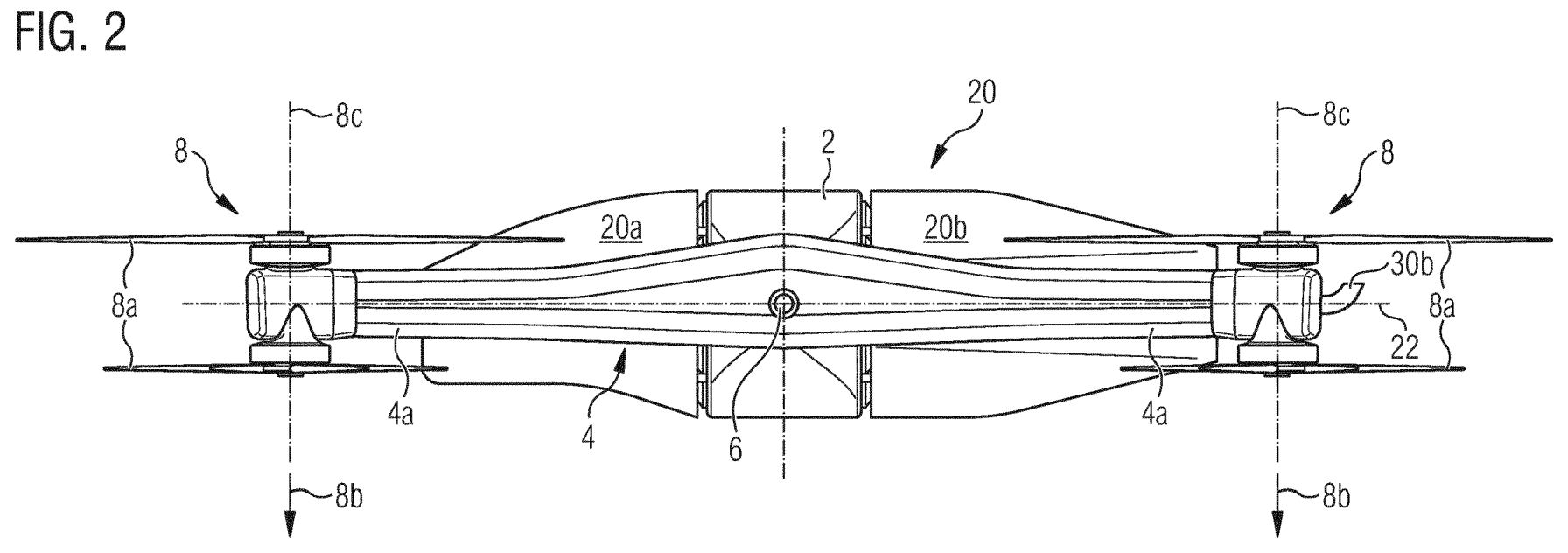

FIG. 2 a side view of the aircraft of FIG. 1 with the rotor arms and the nacelle in the neutral position relative to the yoke;

FIG. 3 the side view of FIG. 2, in which the rotor arm is pivoted out of the neutral position relative to the yoke and the nacelle;

FIG. 4 a front view of the aircraft of FIG. 1 with the rotor arms and the yoke each in a neutral position relative to the nacelle;

FIG. 5 the front view of FIG. 4, in which the yoke is pivoted out of the neutral position relative to the nacelle, and FIG. 6 an enlarged individual view of the assembly formed by the yoke and nacelle schematically in longitudinal section according to a first preferred exemplary embodiment (FIG. 6a) and a second preferred exemplary embodiment (FIG. 6b).

The figures show an aircraft according to a preferred exemplary embodiment, which is in particular a drone.

The aircraft has a supporting body 2, which is alternatively also referred to as a "center piece" or "yoke", wherein the term "yoke" is used below. In the exemplary embodiment shown, the yoke 2 consists of an elongated body with an arm 4 arranged at each end 2a. The arms 4 are mounted at the ends 2a of the yoke 2 so as to be pivotable about a first axis of pivoting 6, which runs in the longitudinal direction of the yoke 2. In the exemplary embodiment shown, the two arms 4 extend parallel to each other and at right angles to the yoke 2.

A propulsion drive 8 is arranged at the two ends 4a of each arm 4. Accordingly, the arms 4 are support arms for mounting the propulsion drives 8 at their ends 4a. In the exemplary embodiment shown, rotor drives are used as propulsion drives 8, each of which has two rotor wings 8a lying one above the other, the rotation of which generates a propulsive thrust in the direction of the arrow 8b. The two rotor wings 8a rotate around a common axis of rotation 8c, which thus extends in the direction of propulsion 8b. The propulsion drives 8 each contain an unspecified motor to rotationally drive the rotor blades 8a.

As FIG. 1 also shows, the arms 4 are mounted in the middle between the propulsion drives 8 arranged at their ends 4a about the first axis of pivoting 6. Accordingly, in the exemplary embodiment shown, the transverse distance between the first axis of pivoting 6 and the axis of rotation 8*c* of one propulsion drive 8 is essentially identical to the transverse distance to the axis of rotation 8*c* of the opposite other propulsion drive 8. In the exemplary embodiment shown, the two arms 4 have the same length, so that the distance between the axes of rotation 8*c* is the same for each arm 4. Furthermore, the axes of rotation 8*c* of the two propulsion units 8 of each arm 4 run parallel to each other and are oriented at right angles to the longitudinal extension of the arm 4 and also at right angles to the first axis of pivoting 6, which therefore also applies equally to the direction of propulsion 8*b*. A pivoting movement about the first axis of pivoting 6 results in a pivoting movement of both the arm 4 in the manner of a double lever and the axes of rotation 8*c* along a virtual plane of pivoting (not shown in the figures) at right angles to the first axis of pivoting 6. Due to the invariable relative orientation of the direction of propulsion 8*b* of the propulsion drives 8 in relation to the respective arm 4, the relative orientation of the directions of propulsion 8*b* in relation to the arm 4 and thus also in relation to the aforementioned virtual axis of pivoting remains constant in every stage of pivoting of the arm 4. This means that an additional pivoting of the propulsion drives 8 with their direction of propulsion 8*b* about a further pivot axis running at an angle to the respective arm 4 and about a further axis of pivoting running at an angle to the first axis of pivoting 6 is excluded, so that the propulsion drives 8 can only be pivoted about the first axis of pivoting 6 and thus this pivoting movement forms the only pivoting movement of the propulsion drives 8.

This can be seen in particular by comparing FIG. 2 with FIG. 3, in which the said virtual plane of pivoting lies in the drawing plane of these two figures.

As FIG. 1 also shows, the aircraft shown also has a nacelle 20, which is arranged on the yoke 2. The nacelle 2 is mounted relative to the yoke 2 so as to be pivotable about a second axis of pivoting 22, which in the illustrated exemplary embodiment is oriented at right angles to the first axis of pivoting 6. Furthermore, the second axis of pivoting 22 intersects the first axis of pivoting 6 at a point whose distance to one end 2*a* of the yoke 2 and thus to the arm 4 mounted thereon so as to be pivotable, is equal to the distance to the opposite other end 2*a* of the yoke 2 and the other arm 4 mounted there so as to be pivotable, whereby the nacelle 20 is mounted centrally on the yoke 2, so as to be pivotable.

In FIGS. 1, 2, and 4, the aircraft is shown in a state in which the arms 4 and the nacelle 20 are in an non-pivotable and thus neutral position relative to the yoke 2. In this operating state, the first axis of pivoting 6 and the second axis of pivoting 22 as well as the arms 4 lie in a common virtual plane, as FIG. 1 shows, although this common virtual plane is not shown.

In FIG. 3, the aircraft is shown in an operating state in which the arm 4 shown there is pivoted about the first axis of pivoting 6 (oriented at right angles to the drawing plane of FIG. 3) out of the neutral position at an angle relative to the yoke 2 and the second axis of pivoting 22.

In FIG. 5, the aircraft is shown in an operating state in which the yoke 2 is pivoted about the second axis of pivoting 22 (oriented at right angles to the plane of the drawing in FIG. 5) out of the neutral position at an angle relative to the nacelle 20.

The two arms 4 can be pivoted independently of each other about the first axis of pivoting 6, which in particular has the function of a pitch axis. This means that the two arms can assume a differently inclined or opposite pivoting position in relation to the yoke 2 and the nacelle 20. The yoke 2 can also be pivoted independently of the pivoting movements of the arms 4 about the second axis of pivoting 22, which in particular has the function of a rolling axis.

For the independent adjustment of the two arms 4 about the first axis of pivoting 6 and of the nacelle 20 about the second axis of pivoting 22, separate actuating drives 10, 24 are provided, as shown schematically in FIGS. 6*a* and *b*, each of which preferably operates electrically. For example, the actuating drives can each have at least two motors with gearboxes to achieve redundancy and eliminate gear backlash, as well as a brake that blocks the gearbox and is switched on using electromagnets in particular. The actuating drives 10, 24 are preferably arranged inside the yoke 2.

In the exemplary embodiments shown schematically in FIGS. 6*a* and *b*, the first actuating drives 10 each have a motor 10*a* for independent adjustment of the two arms 4, which drives a shaft 10*c*, which is mounted so as to rotate about the first axis of pivoting 6 and which is connected to the respective arm 4 so as to be nonrotatable, via a gearbox 10*b*, for example a belt and/or gear drive. Instead of the gearbox 10*b*, a direct drive can also be provided, in which case the motor 10*a* drives the shaft 10*c* directly.

As FIGS. 1 and 6*a* and *b* also show, in the illustrated exemplary embodiment the nacelle 20 is divided into a front section 20*a* and a rear section 20*b*. In the exemplary embodiment shown, these two sections 20*a* and 20*b* are non-rotatably connected to each other via a center piece 20*c*, which is designed as a cylinder whose central axis coincides with the second axis of pivoting 22. The yoke 2 is mounted so as to rotate around this cylindrical center piece 20*c*. When using a fuel-based drive, the cylindrical center piece 20*c* can be designed as a tank for liquid or gaseous fuels. In the exemplary embodiments shown schematically in FIGS. 6*a* and *b*, the second actuating drive 24 for adjusting the yoke 2 relative to the nacelle 20 also has a motor 24*a* which, via a gearbox 24*b*, for example a belt and/or gear drive, imparts a rotary movement to the yoke 2 relative to the center piece 20*c* of the nacelle 20 about the second axis of pivoting 22. Instead of the gearbox 24*b*, a direct drive can also be provided, wherein the motor 24*a* directly drives the yoke 2 with a rotary movement relative to the center piece 20*c* of the nacelle 20.

Furthermore, sensors 12, 26 are provided which detect the pivoting position of the arms 4 in space and/or relative to the yoke 2 and the pivoting position of the yoke 2 in space and/or relative to the nacelle 20. In the exemplary embodiment illustrated in FIG. 6*a*, the sensors 12, 26 are arranged on the motor 10*a* or 24*a* of the actuating drives 10, 24 and detect the rotation of the motor 10*a* or 24*a*, so that in this exemplary embodiment the sensors 12, 26 are preferably designed as incremental encoders. Alternatively, however, it is also conceivable, for example, to arrange the sensors 12, 26 separately from the drives 10*a*, 24*a* of the first and second actuating drives 10, 24, as shown schematically in FIG. 6*b*. In the exemplary embodiment shown in FIG. 6*b*, the first sensor 12 is preferably provided for directly detecting the rotational position of the shaft 10*c* and thus of the associated arm 4, wherein the detection of the rotational position can in particular also take place without contact. The same applies to the second sensor 26, which essentially directly detects the relative pivoting position of the yoke 2 with respect to the nacelle 20, preferably in a non-contact manner, and unlike the first sensor 12 is not arranged in the yoke 2, but in the first section 20*a* of the nacelle 20. Alternatively, it is of course also conceivable to arrange the second sensor 26 inside the yoke 2. It is also conceivable that at least some of the sensors 12, 26 are additionally or alternatively provided for position or attitude detection in the manner of a gyro sensor or are designed as a gyro sensor in order to determine the pivoting position of the arms 4 relative to the yoke 2 and the pivoting position of the yoke 2 relative to the nacelle 20 with respect to a spatially fixed reference variable such as the earth's vertical and/or the force of gravity. In particular, in deviation from the schematic illustrations of FIG. 6, further position or attitude sensors should be arranged in the arms 4 in addition to the sensors 12 or alternatively the sensors 12 as position or attitude sensors in order to determine their pivoting position relative to the yoke 2 with respect to a spatially fixed reference variable such as the earth's vertical and/or force of gravity. Of course, the sensors 12, 26 can also be arranged at a different location within the aircraft compared to the exemplary figures of FIGS. 6*a* and *b*, provided that they are still capable of detecting the relative pivoting position.

Furthermore, a control device 28 is provided which, using the output signals from the sensors, controls the first actuating drives 10 for the arms 4 so that the arms 4 assume a specific pivoting position in space and/or relative to the yoke 2 about the first axis of pivoting 6, and controls the second actuating drive 24 for pivoting the yoke 2 relative to the nacelle 20 so that the yoke 2 assumes a specific pivoting position in space and/or relative to the nacelle 20 about the second axis of pivoting 22. In the exemplary embodiment illustrated in FIG. 6*a*, the control device 28 is arranged within the yoke 2, whereas in the exemplary embodiment illustrated in FIG. 6*b*, the control device 28 is arranged within the nacelle 20. An advantageous flight state of the described aircraft consists in particular in the fact that the control device 28 controls the actuating drives 10, 24 in such a way that the nacelle 20 remains in a fixed orientation when the arms 4 and/or the yoke 2 are pivoted, as can be seen by comparing FIGS. 3 and 5 with FIGS. 2 and 4.

In the illustrated exemplary embodiment, a power generation device 30 is provided for the power supply, which, as shown schematically in FIGS. 6*a* and *b*, has an internal combustion engine 30*a* with an exhaust system 30*b* projecting from the rear section 20*b* of the nacelle 20 and an electric generator 30*c*, which is driven by the internal combustion engine 30*a* to generate electricity.

The nacelle 20 is used for receiving the payload, which in principle also includes the power generating device 30 described above. In particular, the payload is a sensor system for the positional, locational and dimensional detecting and modeling of buildings, infrastructure, and/or other (natural) spatial structures. Such a payload is shown schematically in FIGS. 6*a* and *b*, for example in the front section 20*a* of the nacelle 20.

Finally, the nacelle 20 can be aerodynamically shaped in such a way that it generates lift during flight. The yoke 2 can also be aerodynamically shaped in such a way that it generates lift during flight, for which purpose it can have the shape of a wing in particular.

The invention claimed is:

1. An aircraft, comprising:
a supporting body;
at least two propulsion arrangements arranged at a distance from one another on the supporting body, which are designed to generate a propulsive thrust in a direction of propulsion, the propulsion arrangements being mounted on the supporting body so as to be pivotable about a first axis of pivoting running at an angle to the direction of propulsion;

a first actuating drive which is designed to pivot the propulsion arrangements about the first axis of pivoting;
a trunk body which is mounted on the supporting body so as to be pivotable about a second axis of pivoting; and
a second actuating drive, which is designed to pivot the supporting body relative to the trunk body.

2. The aircraft according to claim 1, in which a relative orientation of the direction of propulsion of the propulsion arrangements with respect to a virtual plane of pivoting at right angles to the first axis of pivoting remains constant in each stage of pivoting of the propulsion arrangements.

3. The aircraft according to claim 1 in which the propulsion arrangements are mounted on the supporting body so as to be pivotable about a first axis of pivoting extending essentially at right angles to the direction of propulsion.

4. The aircraft according to claim 2, in which the direction of propulsion of the propulsion arrangements lies in the virtual plane of pivoting at right angles to the first axis of pivoting or is oriented parallel to this virtual plane of pivoting in each pivoting position of the propulsion arrangements.

5. The aircraft according to claim 1, wherein the propulsion arrangements are mounted so as to be pivotable about a common first axis of pivoting.

6. The aircraft according to claim 1, wherein at least one propulsion arrangement comprises at least one propulsion drive which is designed to generate the propulsive thrust in the direction of propulsion.

7. The aircraft according to claim 6, in which at least one propulsion arrangement has a support element and two propulsion drives arranged at a distance from one another on the support element, the support element being mounted so as to be pivotable about the first axis of pivoting at a point between the two propulsion drives.

8. The aircraft according to claim 7, in which the support element is mounted so as to be pivotable about the first axis of pivoting at a point which is essentially at a same distance from both propulsion drives.

9. The aircraft according to claim 7, in which a relative orientation of the direction of propulsion of the propulsion drives with respect to the support element remains constant in any stage of pivoting of the propulsion arrangements.

10. The aircraft according to claim 6, wherein at least one propulsion arrangement comprises at least two propulsion drives whose directions of propulsion are oriented parallel to each other.

11. The aircraft according to claim 6, wherein at least one propulsion drive is a rotor driven about an axis of rotation, wherein the axis of rotation defines the direction of propulsion.

12. The aircraft according to claim 8, in which the propulsion drives each have a rotor which can rotate about an axis of rotation and the support element is mounted so as to be pivotable about the first axis of pivoting at a point essentially at the same distance from an axes of rotation of the rotors.

13. The aircraft according to claim 1, wherein at least one propulsion drive is a turbine.

14. The aircraft according to claim 1, comprising:
a first sensor device which is designed to detect a pivoting position of the propulsion arrangements in space and/or relative to the supporting body; and
a control device which is designed to control the first actuating drive using signals from the first sensor device in such a way that the propulsion arrangements assume a specific pivoting position in space and/or with respect to the supporting body.

15. The aircraft according to claim 1, in which the second axis of pivoting is oriented at an angle to the first axis of pivoting.

16. The aircraft according to claim 15, wherein the second axis of pivoting is oriented essentially at right angles to the first axis of pivoting.

17. The aircraft according to claim 1, wherein the trunk body is mounted so as to be pivotable at a position of the supporting body which is essentially at a same distance from the two propulsion arrangements.

18. The aircraft according to claim 1, wherein the second axis of pivoting is oriented angularly with respect to the direction of propulsion.

19. The aircraft according to claim 18, wherein the second axis of pivoting is oriented essentially at right angles to the direction of propulsion.

20. The aircraft according to claim 1, comprising:

a second sensor device, which is designed to detect a pivoting position of the supporting body in space and/or relative to the trunk body and;

a control device which is designed to control the second actuating drive using signals from the second sensor device in such a way that the supporting body assumes a specific pivoting position in space and/or relative to the trunk body.

21. The aircraft according to claim 20, in which the control device is designed to control the second actuating drive in such a way that the trunk body remains essentially in a predetermined spatially fixed orientation.

22. The aircraft according to claim 21, in which a common control device is provided, which is designed to control the first and second actuating drives in such a way that the trunk body remains essentially in a predetermined spatially fixed orientation.

23. The aircraft according to claim 1, wherein the trunk body is designed to receive a payload.

24. The aircraft according to claim 23, in which the trunk body has a first section which extends from the first axis of pivoting in a first direction and is provided for receiving payload and is designed as a nacelle, and a second section which extends from the first axis of pivoting in a second direction oriented at an angle to the first direction and at least partially contains an energy supply device.

25. The aircraft according to claim 1, wherein the trunk body is aerodynamically shaped such that it generates lift during flight.

26. The aircraft according to claim 1, in which the supporting body is aerodynamically shaped such that it generates lift during flight, and has a shape of a wing.

* * * * *